Oct. 27, 1959 L. SPITZER, JR 2,910,414
HIGH TEMPERATURE APPARATUS
Filed July 31, 1951 3 Sheets-Sheet 1
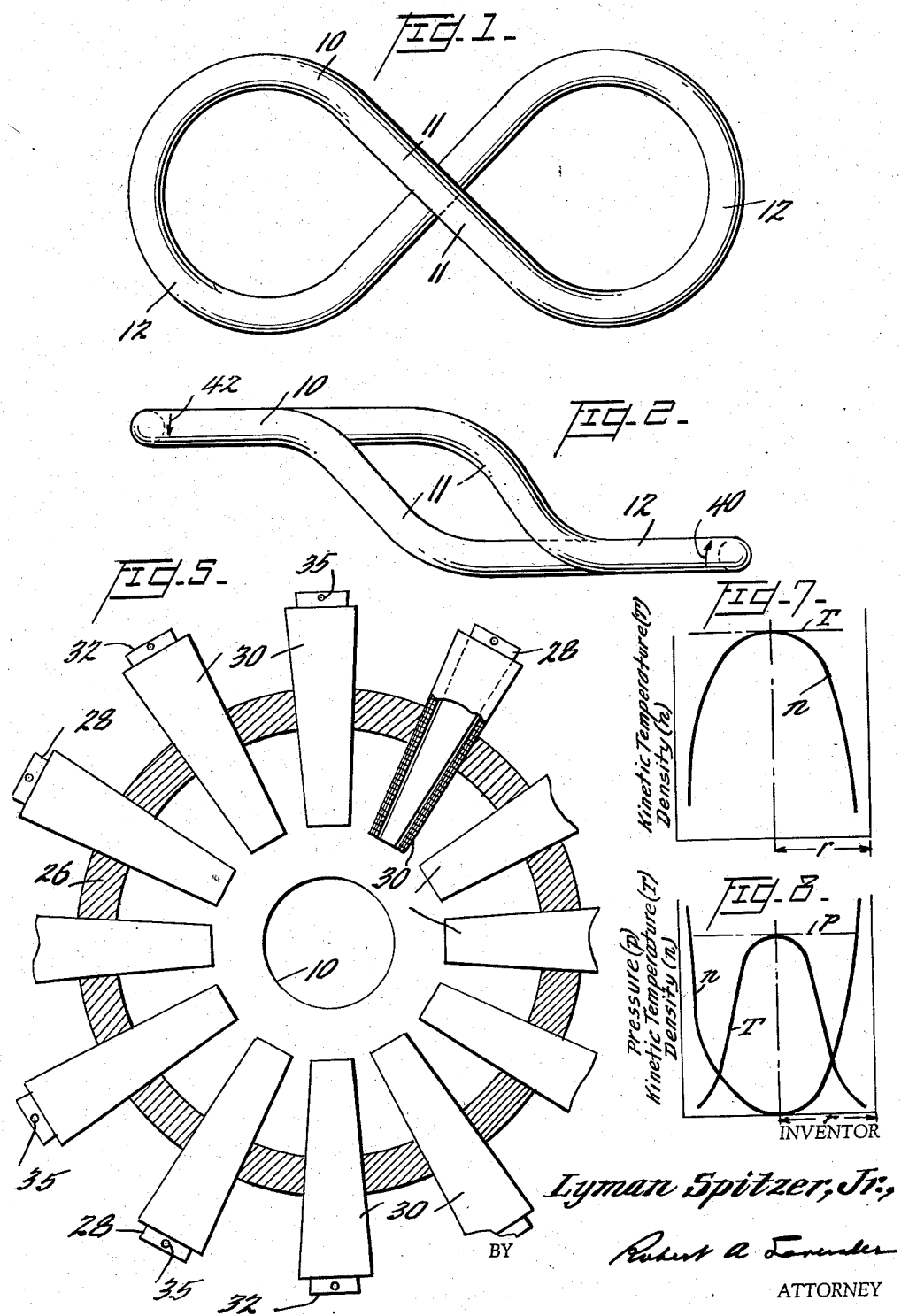
INVENTOR
Lyman Spitzer, Jr.,
BY
Robert A. Lavender
ATTORNEY

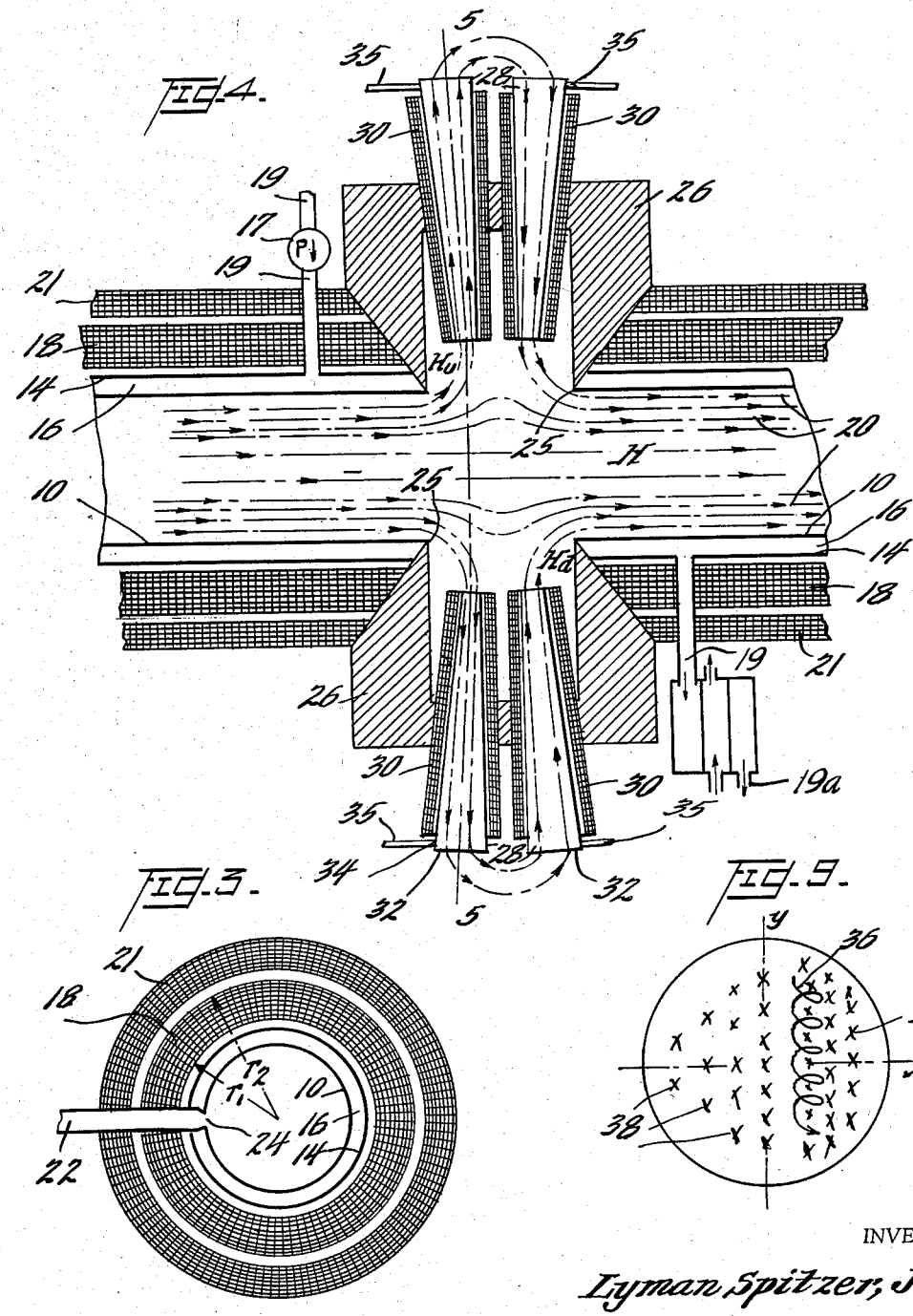

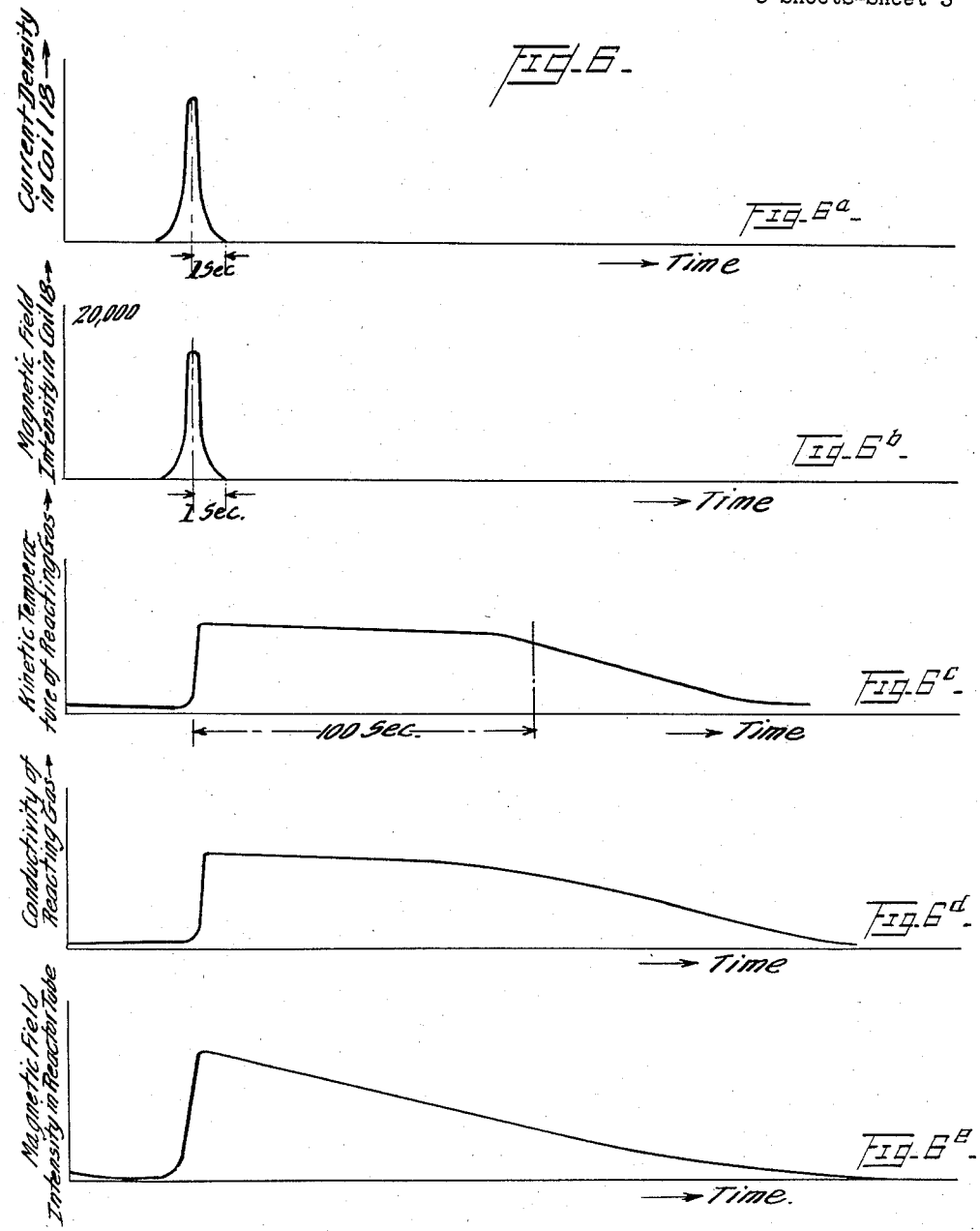

United States Patent Office 2,910,414
Patented Oct. 27, 1959

2,910,414

HIGH TEMPERATURE APPARATUS

Lyman Spitzer, Jr., Princeton, N.J., assignor to Research Corporation, New York, N.Y., a corporation of New York Application July 31, 1951, Serial No. 239,419

8 Claims. (Cl. 204—154.2)

This invention relates generally to reactors and more particularly to the methods of and apparatus for producing and controlling the nuclear reactions, the absorbing of the energy released thereby and the capture of nuclear particles radiated in such reactions.

Briefly, the invention consists of a container in which the reacting materials (referred to hereinafter in this specification and the appended claims as "reactants") are confined, and in which reactions nuclear (or so-called atomic) energy is generated or released in the form of high energy radiated or emitted nuclear particles. The changed form of reactant ions created by the reactions will be referred to hereinafter in this specification and in the appended claims as "reacted particles." The container is surrounded by a layer of a material to slow down the radiated particles and thereby absorb the radiated energy thereof, a layer of a material to capture the slowed radiated particles, and electromagnetic coils to produce and impose a magnetic field on the space within the container.

The magnetic field is unidirectional axially of the container and is of such intensity as to confine generally the reactants and reacted particles to the central zone of the container and delay the ionized reactant particles and electrons from contacting the walls of the container and thus losing their high energy.

In the initiation of the reactions, the reactant atoms may be ionized and raised to high kinetic temperatures in several ways. In the present invention, this is accomplished by the electromagnetic forces resulting from the transitory increasing of the unidirectional magnetic field beginning at the instant the currents are applied to the magnetic coils. It is also provided that an alternating magnetic field be applied to the space within the container to assist in the initiating of the reactions.

The reactants within the container are the lighter elements in the atomic scale and are in a gaseous form. The reactants are fed through jet orifices into the container in the form of gases, liquids or finely divided solids, either continuously or intermittently and the reacted particles are withdrawn from the container either with or without the aid of magnetic fields, by an evacuating pump, or they may be withdrawn through holes in the walls of the container by the force of the pressure within the container. The reactions are controlled by varying the quantities of the reactants within the container and by varying the strength and/or the duration of the magnetic field imposed upon the reaction zone in the container. The energy radiated by the reactions is absorbed as heat by materials that slow down the high velocity radiated nuclear particles, which heat may be transformed into mechanical energy by the use of conventional heat engines, such as turbines. The slowed radiated particles are available to react with the nuclei of other elements to form isotopes of such elements or new elements, or for any other purpose.

Embodiments of the invention are given the coined name "Stellarators," as the reactions taking place within the container of the embodiments or species of the invention are similar in some respects to the reactions taking place in some of the stars.

For purposes of description and analysis of the relations between physical dimensions and physical forms of Stellarators and the variable operating conditions of the invention, a "standard condition" Stellarator is disclosed as a round continuous tube of 100 cm. in diameter and bent into the form of a "figure 8," the end sections or loops thereof being bent into a circular shape and having a radius of curvature of 350 cms. The end loops are in parallel planes. For these dimensions, the magnetic field imposed on the reacting zone in the tube is of the order of 20,000 gauss and the kinetic temperature in the reacting zone in the tube is of the order of $10^8$ degrees, Kelvin. These general dimensions and values and values of other operational variables will be referred to hereinafter as "standard" conditions.

The principal object of the invention is to provide a Stellarator as a source of high energy radiated nuclear particles.

Another object of the invention is to provide a Stellarator as a source of high energy nuclear particles and to transform the energy of said particles into heat as a source of mechanical power.

Another object of the invention is to provide a Stellarator as a source of radiated nuclear particles to react with the nuclei of target elements to form, by nuclear capture, other isotopes of said elements or isotopes of other elements.

Another object of the invention is to provide a Stellarator as a source of neutrons for further nuclear reactions.

Another object of the invention is to provide a Stellarator in which the high temperature reactions are confined to the central axial zones of the reactor tube of the Stellarator.

Another object of the invention is to provide a Stellarator in which the walls of the reaction tube are protected from the high temperatures within the reaction tube by the use of a magnetic field.

Another object of the invention is to provide a Stellarator in which the walls of the reaction tube are protected from high temperature reactant ions and reacted particles by removing a major portion of them as they approach the walls of the tube and before they actually touch the walls of the tube.

Another object of the invention is to provide a Stellarator in which the walls of the tube are protected from the high temperatures within the reaction tube by lowering of the density of the reacting and reacted particles near the walls of the tubes.

Another object of the invention is to provide a tube in a Stellarator of such form that the drift of charged particles in one section of the tube is in one direction and in another section of the tube is in the opposite direction.

Another object of the invention is to provide a Stellarator in which the lines of force of the magnetic field in the reactor tube are parallel to the axis of said tube and the strength of said magnetic field varies in accordance with a predetermined cycle.

Another object of the invention is to provide a Stellarator in which the material for slowing down and absorbing the energy of the radiated nuclear particles is heavy water.

Another object of the invention is to provide a Stellarator in which the material for capturing the radiated nuclear particles is lithium.

Other objects of the invention will become apparent from the following description of the several embodiments of the invention, including the drawings made a part thereof, and in which:

Figure 1 is a plan view of the reactor tube in an embodiment of the invention;

Figure 2 is a side elevation of the tube in Figure 1;

Figure 3 is a radial line cross section view of one leg of a Stellarator showing the relative positions of the reactor tube, the medium for slowing the velocities and absorbing the energy of the radiated nuclear particles, the medium for capturing the radiated particles, and the coils for establishing the magnetic field imposed upon the space within the tube;

Figure 4 is a line axial cross section of the reactor tube in the first embodiment of the invention showing the paths of the magnetic lines of force within and outside the tube at a position along the tube at which reacted particles within the tube and approaching the walls of the tube are removed from the tube;

Figure 5 is a line radial cross section view taken on line 5—5 of Figure 4;

Figure 6 is a series of graphs of operation characteristics of a second embodiment of the invention, showing the relation of time intervals and, respectively, (a) the values of current density within the electromagnetic coils, (b) the strength of the magnetic field within the electromagnetic coils, (c) the temperature in the reacting zone within the reactor tube, (d) the conductivity of the reacting gases in the tube, and (e) strength of the magnetic field within the reactor tube;

Figure 7 is a graph showing the relation between kinetic temperatures and gas densities, respectively, to radial zones of the reactor tube of the said first embodiment of the invention;

Figure 8 is a graph showing the relation between kinetic temperatures, gas densities and pressures, respectively, within the reactor tube to radial zones of the tube in said second embodiment of the invention; and Figure 9 is a schematic diagram showing the relation between individual lines of force in a magnetic field, the lines of force moving into the plane of the paper, and the drift of the spiraling of the positive ions in the $-y$ direction, when the magnetic field increases in intensity in the $+x$ direction.

It has been established that two light nuclei can react with each other and liberate atomic energy, as distinguished from elastic collisions, only when they approach each other to within about $10^{-12}$ cm. As these nuclei carry electrostatic charges, their relative velocities must be very high to overcome the electrostatic repulsion between nuclei at these extremely short distances. It is also known that the velocities of nuclei may be expressed in terms of temperature and, as the phenomena of nuclear reactions involve directly the velocities of the nuclei, $T$ is defined as the "kinetic temperature" of these moving nuclei. All temperature values in this specification will be expressed on the Kelvin scale, except as otherwise noted.

In analyzing the interaction between two moving atomic particles, the "collision parameter" $b$ is defined as the distance of closest approach of two particles to each other that would result if there were no force exerted between them. In a collision between two hydrogen nuclei, each with the charge $e$, the deflection of each nucleus from their respective random directions will be about 90 degrees or more, provided that their mutual electrostatic energy at the distance $b$, numerically equal to $e^2/b$, is as great or greater than the kinetic energy $(3kT/2)$ of the particles, where $k$ is the usual gas constant. If $T$ equals $10^8$ degrees, these two energies are equal when $b$ equals approximately $10^{-11}$ cm., which is approximately ten times the radius of the nucleus. It is thus apparent that virtually no thermonuclear reactions will take place if $T$ is less than $10^6$ degrees and to achieve an appreciable reaction rate $T$ must be approximately $10^8$ degrees or more.

A second requirement is that the density of the interacting particles be kept low. This is necessary if the pressure of the gas is to be sufficiently low to avoid explosions. If $n$ is the number of particles per cubic cm., or particle density, the pressure in atmospheres should be approximately $10^{-6}nkT$, where $k$ is the gas constant. If the pressure in the reactor tube is not to exceed 10 atmospheres, and $T$ is $10^8$ degrees, then $n$ must not exceed $10^{15}$ particles per cubic cm., which is less than the particle density of ordinary air by about $1/10,000$. For intermittent operation it is possible to use higher densities in a small region at the center of a relatively large container, so that the gases in the high-density region, after reactions take place, expand into the larger region, with the result that the pressures experienced by the wall are relatively low; for steady state operation, however, these lower densities are desirable.

At the low densities required for a practical and steady operation of a Stellarator operating with a constant magnetic field in the reactor tube, an ion or electron will spend most of its time moving freely within the reaction zone, that is, its free path between collisions is very long. For example, if the particle density $n$ in the reactor is $10^{14}$ per cubic cm., a deuteron will travel 300 kilometers before it is deflected 90° or more by a collision with another deuteron. The cumulative effect of many small deflections will decrease this mean free path to about 3 kilometers. If the deuteron collides during this time with the walls of the reactor, whose operating temperature should not exceed some thousand degrees, the deuteron will lose a large part of its hundred-million-degree energy. Evidently, to maintain sufficiently high reacting temperatures, which are necessary for the reactions to continue, the nuclei must be prevented from hitting the wall. If the ions move in straight lines, this requirement would result in a container whose dimensions would be many kilometers, which is clearly impractical.

To keep the ions from hitting the walls of the reactor, some type of force is required that will act at a distance from the walls. Gravitational forces are too small. Electrical forces act oppositely on positive ions and electrons and cannot simultaneously confine both types of particles. Since electrons must always be present in numbers equal to the positive ions, to avert the production of colossal electrical fields, and since the electrons will tend to possess the same energy as the positive nuclei, both types of particle must be confined or kept away from the walls of the reactor container or tube. A magnetic field is, therefore, provided to confine both the electrons and the positive ions within a small volume reaction zone and thereby prevent them from colliding with the walls of the tube.

In the presence of a strong magnetic field, a charged particle simply circles about the lines of force of the field, and moves only slowly across the field. For a deuteron moving at 1000 kilometers per second, corresponding to a kinetic temperature of about $10^8$ degrees, the radius of curvature of the deuteron in a magnetic field of 20,000 gauss is approximately 1 cm., and for an electron the radius of curvature is about .015 cm. If a high electric current is caused to flow through a coil positioned axially and around a tube, and the tube is bent so that the two ends are joined to form a continuous tube, most of the magnetic lines of force will stay inside the tube, and charged particles will tend to follow these lines of force, without encountering the walls.

FINITE CYLINDRICAL REACTOR

Referring to Figures 1, 2 and 3, 10 is a continuous tube of circular cross section and bent into the general form of a "figure 8" or pretzel, that is, the intercrossing center sections 11 of the tube pass one above the other. The tube may be made of glass or some metal permeable to a magnetic field. For the "standard conditions" defined hereinbefore the diameter of the tube 10 is 100 cm. The radius of curvature of the circular end loops of tube 10, shown generally at 12, 12, for the "standard conditions" is approximately 350 cm. End loops 12 are parallel to each other and their planes may be separated from each other, as shown in Figure 2.

Referring particularly to Figure 3, tube 10 is surrounded by a second tube 14, likewise permeable to a magnetic field, and between tubes 10 and 14, as at 16, is placed a medium, such as heavy water, for slowing down and absorbing the energy possessed by the nuclear particles radiated as the result of reactions within the tube 10. It is obvious that the said slowing and energy absorbing medium may be placed in a separate tube as a matter of structural convenience. The radiated energy absorbed is transformed into heat in the said medium. The medium is circulated around tube 10 by pump 17 (see Figure 4) and is conveyed by pipes 19 to and from a conventional heat exchanger 19a for use as a source of power for a conventional heat engine, such as a turbine (not shown).

The tube 14 is made of some magnetic-field permeable material that readily captures the slowed nuclear particles radiated from the reaction zone in tube 10. For capturing neutrons, lithium may be used as lithium readily captures neutrons even at low energies. In case lithium is used to capture neutrons, tritium is formed. It is obvious that the nuclear particles radiated by the nuclear reactions in tube 10 may be used for other nucleonic reactive purposes.

Radially outward from tube 14 is the electromagnetic coil shown generally at 18, with inner radius of $r_1$ and outer radius of $r_2$, the turns of coil 18 being wound at right angles to the axis of tube 10 to impose a magnetic field H within tube 10, the lines of force 20 (Figure 4) of said field being inside and parallel to the axis of tube 10. Electromagnetic coil shown generally at 21, is coaxial with coil 18 and is supplied with an alternating current to assist, when desirable, in the ionization of the reactants in the reactor tube and initiate reactions.

Both the absorbing material of the tube 14 and the coils 18 and 21 have water or other cooling agent circulating through or around them in small separate tubes in a conventional manner (not shown).

A tube 22 passes through coils 18 and 21, tubes 14 and 10, and medium 16 to supply the tube 10 with reacting materials, which materials are forced into tube 10 through jet orifice 24 at the inner end of tube 22. Similarly, other tubes 22 (not shown) are provided through coils 18 and 21, tubes 14 and 10, and medium 16 for the removal or escape of the reacted particles from tube 10.

Two species or embodiments of the Stellarator and methods of operation thereof are shown: A, in which the magnetic field H is of a constant value and keeps the greater portion of the ionized reactant and reacted particles from contacting the walls of tube 10 until they are withdrawn from the tube by a separately excited magnetic field (see Figure 4); and B, in which the magnetic field H is unidirectional but intermittent and in continuing cycles (see Figure 6), and the reacted particles are permitted to contact the walls of tube 10 and leak out through tubes 22.

Species A

Reference is made to Figure 4, which is a line axial cross section view of Species A taken at a position along the reactor tube 10 where a separately excited magnetic field withdraws the reacted particles from the reactor tube. Reference is also made to Figure 5, which is a line radial cross section view taken on line 5—5 in Figure 4. As shown in these two figures, a constant magnetic field, the lines of force 20 of which are shown generally at H, is applied to the space inside tube 10 by currents in the electromagnetic coil 18. Radially inward from coil 18 are, respectively, radiation-particle-capturing tube 14 and radiation particle slowing and energy-absorbing medium 16.

The linear continuities of coils 18 and 21 are interrupted by a hollow iron ring yoke 26, the cross section area of which is approximately that of coil 18. Likewise, the linear continuities of tubes 10 and 14 are interrupted to form gaps in these tubes, shown generally at 25, 25. The space between the tubes 10 and 14 is blanked off at the gap. This iron yoke 26 provides a low reluctance loop for the magnetic lines of force in the outer radial zone of tube 10 and bends these lines of force radially outward from the gap in tube 10, thereby providing more space into which the lines of force within and near the walls of tube 10 may expand, with resulting weakening of the magnetic field at this point.

Extending radially inward through yoke 26 are a plurality of pairs of inwardly converging tubes or hollow truncated cones 28, 28, around each of which are positioned electromagnetic coils 30, 30. The electric conductors in coils 30 are so wound as to bend the outer lines of force on the up-stream side of field H into the gap 25 of tube 10 and into the up-stream cone 28, as at $H_u$, and permit these lines of force to enter tube 10 again as at $H_d$. At the outer ends of cones 28 are plates 32, permeable by a magnetic field, on which plates impinge some of the reacting particles and the reacted particles flowing along the magnetic lines of force in the outer radial zone of tube 10. Upon striking plates 32, these charged particles are neutralized. Plates 32 are cooled by liquids in a conventional manner (not shown). The walls of the cones 28 are pierced near their outer ends as at 34 by pipes 35 through which pipes the neutralized particles are withdrawn from the cones. It will be apparent that tendencies for particles to rebound from plates 28 towards tube 10 are to a great extent overcome by the increasing strength of the magnetic field axially inwardly within the cones 28 because of the inwardly converging walls of the cones.

Species B

The mechanical constuction of Species B is the same as for Species A, except that there is no gap 25 in the continuities of the walls of the reactor tube 10, tube 14 or coils 18 and 21 for positioning cones 28 and associated parts. There are, however, holes through tubes 10 and 14, and coils 18 for passing tubes 22 (see Figure 3) therethrough to supply reacting material to tube 10. Similar tubes are provided to withdraw burned particles from the reactor tube 10. The Species B Stellarator magnetic field in tube 10 is unidirectional and intermittent rather than steady, as in Species A Stellarator (see Figure 6). The operational characteristics of Species B will be explained in detail hereinafter.

OPERATION.—POWER REQUIREMENTS, CONDITIONS AND LOSSES

The electrical power required to maintain per cm. length a steady magnetic field H within the inner radius $r_1$ of coil 18, as in Species A, may be calculated from the standard equation $$H = \frac{4\pi j}{10}(r_2 - r_1) \quad (1)$$

where H is expressed in gauss, $j$ is the current density in amperes per square cm. within the coil and $r_1$ and $r_2$ are expressed in cm. The power dissipation $P_H$ per linear cm., expressed in watts, becomes $$P_H = (\pi r_2^2 - \pi r_1^2)\frac{j^2}{m} = \frac{25}{4\pi} \cdot \frac{r_2 + r_1}{r_2 - r_1} \cdot \frac{H^2}{m} \quad (2)$$

where $m$ is the conductivity of the coil material in mhos.

As the currents required to produce a steady magnetic field of 20,000 gauss are quite large, some conventional provision may be made to cool the current carrying material. Taking the conductivity of copper at 100 degrees centigrade as $4.4 \times 10^5$ mho/cm. and dividing this value by 2 on the basis that half of the physical volume of coil 18 will be occupied by a cooling liquid and insulation, and for a coil in which $r_2/r_1$ equals 2, then for a magnetic field of 20,000 gauss $P_H$ will equal 11,000 watts/cm. The power required for producing the magnetic field in the reactor tube 10 ($P_H$) may of course be materially reduced by maintaining the coils at much lower operating temperatures than 100 degrees centigrade by, for example, cooling the coils by liquid air. With liquid air cooling, the conductivity of the copper would be one-tenth of the value taken hereinbefore and allowing for the electrical power required to cool the air to a liquid, the electrical power required per cm. of length of coil 18 would approximate 2,200 watts. It is obvious that if coil 18 is cooled by liquid hydrogen the electric power required for coil 18 for the "standard" conditions would be reduced by a further factor of 10.

In the operation of the Species B Stellarator, the electrical power required to maintain the magnetic field in the reactor tube 10 is much less than required for Species A, due to the intermittent character of the magnetic field. It is well known that a decrease in strength of a magnetic field produces a current tending to maintain the strength of the magnetic field by inducing a voltage perpendicular to the lines of force of the field. The first effect of the induced voltage is to force the positive ions and electrons into radial outward spirals. However, the net result is to produce a pressure ($nkT$) within the tube that increases radially outwards. This pressure gradient produces a desired current within the gas such that the total pressure, which equals the sum of the magnetic pressure ($H^2/8\pi$) plus the material pressure ($nkT$), is constant throughout the tube.

The characteristics of a magnetic field produced within the gas in tube 10 in Species B by intermittent currents in coil 18 is based upon the fact that in a medium of conductivity of $m$ mhos/cm., the time ($t_H$) in seconds for the magnetic field to decay to $1/e$ of its initial value is $$t_H = 10^{-9} k m r^2 \qquad (3)$$

where $e$ is the Napierian logarithm base, $k$ is a constant of a magnitude of approximately unity, its value depending upon the particular geometry of the system considered, and $r$ is a measure of the size of the conducting region. (See Lamb, Philosophical Society, London (1883), vol. 174, p. 519.)

If $r$ be 50 centimeters, then $t_H$ is approximately one second for a magnetic field sustained by currents in solid copper and approximately 100 seconds for a magnetic field maintained by currents in gaseous hydrogen (including deuterium, or tritium) at $10^8$ degrees. If the temperature of the gas is increased to $4 \times 10^8$ degrees (an increase needed in deuteron-deuteron reactions), the conductivity is increased by a factor of 8, and $t_H$ becomes about 800 seconds, or nearly 15 minutes.

It is, therefore, practical to create a magnetic field in coil 18 that will permeate the gas and persist for a considerable time after the current in coil 18 has been turned off. However, the external magnetic field will permeate the gas rapidly only if the conductivity is low, and thus the gas must be "cool" (less than $10^6$ degrees) when the external magnetic field is applied. The following cycle is, therefore, determined:

(a) The gas in the tube is "cool"; (b) a heavy current is passed through coil 18 for less than one second to create a magnetic field of approximately 20,000 gauss (Figure 6(a) and 6(b); (c) when the magnetic field is at this value, a glow discharge is excited within tube 10, thus raising the gas temperature to $10^8$ degrees or higher (Figure 6(c)); (d) the voltage producing the current in the external coil 18 is turned off and the magnetic field in the copper wire dies away in approximately one second. (Alternatively, an opposing voltage may be applied to reduce the current more rapidly and so cut down the heat losses in the external coils.); (e) the magnetic field in the gas is maintained by currents in the gas, decreasing by a fraction $1/e$ in approximately 100 seconds and during which time reactions within the gas generate nuclear power and neutrons (Figure 6(e)); (f) as the magnetic field inside the gas falls, the diffusion losses increase, the temperature falls, reactions cease, and the cycle is completed when the temperature reaches $10^6$ degrees (Figure 6(d)).

DIFFUSION LOSSES AT THE WALLS OF THE REACTOR TUBE 10

*Wall diffusion losses.*—It is well known that in the absence of collisions, paths of ions in a magnetic field tend to be helical spiral in form. The axis of the helical spiral is in the direction of the lines of force, and the ion paths, projected on a plane at right angles to the lines of force, are circles of radius $\rho$. It is also well known that upon elastic collision between two ions, each ion will spiral in another projected circle of the same value of radius but the center of which projected circle is shifted, on the average, a distance of $\rho$ from its former position in the magnetic field. If $\tau$ is the time in seconds between collisions, the center of the projected circle will wander or move a distance $\rho$ in $\tau$ seconds.

As shown in the familiar Brownian theory of motion, after a time $t$ the center of this circle will be displaced a distance $L$, on the average, where $$L^2 = \rho^2 \frac{t}{\tau} \qquad (4)$$

In the present instance the ion will collide with the walls, on the average, when $L$ equals $r$. Hence during each interval of time $\tau \cdot (r/\rho)^2$ the entire kinetic energy of the ions and electrons in the tube will be lost to the walls. The wall loss $P_W$ per centimeter length of tube then becomes $$P_W = \frac{3\pi r^2 n_i k T}{2(r/\rho)^2 \tau} \qquad (5)$$

The value of the time $\tau$ between collisions may be taken from Chandrasekhar. For ions of the root mean square velocity, the time required for the cumulative deflection in many encounters to reach $90°$, that is, for the particle to lose all trace of its former directional motion, is $$\tau = \frac{0.063 m_i^2 v^3}{n_i e^4 \log \beta} \qquad (6)$$

where $m_i$ is the mass of the ion and $\log \beta$ is a quantity which for these conditions equals about 20. (See Principles of Stellar Dynamics (1942), Chapter 2.) Under the defined standard conditions, for deuterons $$\tau = 3.3 \times 10^{-3} \text{ sec.} \qquad (7)$$

The radius of gyration $\rho$ is given by the standard formula $$\rho = \frac{mvc}{eH} \qquad (8)$$

where $m$ is the mass of the particle, $v$ is the velocity of the particle, and $c$ is the velocity of light. For deuterons under the defined standard conditions, the root mean square velocity perpendicular to H is $0.9 \times 10^8$ cm./sec. and $$\rho = 0.9 \text{ cm.} \qquad (9)$$

Thus $r/\rho$ is about 55 for the defined standard conditions, and particles reach the walls after a time interval of $3 \times 10^3 \tau$, on the average, or about 10 seconds. For electrons, $\tau$ is only 0.015 cm.

Combining these various results, $P_W$ becomes $$P_W = \frac{0.91 x^2 m_i^{1/2} c^2 H^2}{(1+Z)^2 (kT)^{3/2}} \qquad (10)$$

For the defined standard conditions, $$P_W = 530 \text{ watts/cm.} \qquad (11)$$

which is approximately equal to $P_R$. Evidently the wall losses are small, in the case considered, compared to $P_H$ in Species A.

*Heat flow to the walls of the reactor tube 10.*—The flow of heat outwards is governed by the familiar equation of heat conductivity. In the operation of a Species B Stellarator, it may appear at first glance that the temperature in the reactor tube 10 would decrease steadily from a high value at the center of the tube to the relatively very low value of perhaps 1000 degrees at the walls. It has been seen, however, that the pressure across the tube will be uniform and as the density of a gas varies inversely as the temperature, the particle density at the walls of tube 10 will be approximately $10^5$ times that at the center of the tube. With increasing density, the thermal conductivity across the magnetic field increases and, therefore, most of the temperature drop will occur relatively close to the axis of the tube (see Figure 8). As a result, the effective tube radius defined in the standard conditions may be substantially reduced.

To reduce the copper requirements in a Series A Stellarator and to reduce the wall losses, the pairs of auxiliary tubes 28, 28, each surrounded by its own electromagnetic coil 30, 30, as hereinbefore described (see Figures 4 and 5), remove the reacting ions and the reacted particles before they reach the walls of tube 10 by bending the lines of force of field H near the walls into the auxiliary tubes 28 and away from the walls of reactor tube 10. The reactant particles and the reacted particles having been neutralized by collision with plates 32, are pumped out through holes 34 and pipes 35 in the form of a gas. This pumped gas may be compressed, the reacted particles removed by physical or chemical processes and the purified material, after enrichment by fresh or pure reactants, is injected back into tube 10 through tube 22 and jet orifice 24, either in a gaseous or liquid form.

*Drift of ions and electrons in a Species A reactor tube.*—In a Species A Stellarator, the ions and electrons drift toward the walls of the reactor tube but are removed from the tube before they reach the walls. The wall losses therefore occur at the outer ends or plates 32 of the auxiliary tubes 28. Under such conditions, there is no flow of heat radially across the tube, except that transported by the drift of the atoms. The temperature radially across the tube 10 is, therefore, practically uniform. Since a material pressure gradient is necessary to maintain an outward drift of ions and electrons, the density within the tube decreases with increasing distances from the axis of the tube. These relations are shown graphically in Figure 7. As the sum of the magnetic and material pressures must be uniform radially throughout the tube, $H^2/8\pi$ will increase radially outwards as $nkT$ diminishes, and $nkT$ at the axis cannot exceed $H^2/8\pi$ at the walls. It is apparent that the outward drift of ions and electrons results entirely from encounters between electrons and ions, is the same for both electrons and positive ions, and is less by an order of magnitude than the value found from the interactions between positive ions considered hereinbefore. Hence $P_W$ is essentially negligible in Species A.

*Effect of the jets of reactants forced into the reactor tube 10.*—In such jets of reactants, the initial density upon entering the tube is much higher than in the reactor tube itself. The initial temperature, however, is much lower. The material of the jet will all be ionized before it has gone far across the tube, but at least a millisecond will be required for the temperature to rise to $10^8$ degrees. Since a jet velocity of over a kilometer per second (defined hereby as a high velocity jet) is feasible, the jet will travel across the reactor to the center thereof before it is dissipated. The magnetic field does not stop the mass motion of the jet, since polarization charges on the sides of the jet will produce an electrical field which counterbalances the effect of the magnetic field. In addition, these jets play an important part in carrying current across the magnetic field and thus tend to neutralize space-charge effects.

*Effect of electrical fields of various types.*—When a strong magnetic field H is present in an ionized gas, and when an electrical field E is also present, perpendicular to H, this electrical field produces primarily not an electric current but a drift motion of the particles in a direction perpendicular to both E and H. This drift motion is the same for both electrons and positive ions.

In the reactors of the present invention, electrical fields perpendicular to H are produced in various ways. Some of the positively charged reaction products ($He^4$ nuclei, for example) will escape from the main tube, leaving the gas with a negative electrostatic charge and the resultant field produces an axial rotation of the entire mass of gas within the tube. Since little or no contact of the particles with the walls is established in Species A, there is no shearing stress to slow down this rotation. The jets forced into the reactor tube, therefore, provide a simple means for reducing the electrostatic field, especially as the cool atoms in the jet will carry an appreciable radial current before the magnetic force on the current accelerates the atoms and until they share in the general rotation of the gas about the axis of the tube.

In Species B the large rotational velocity produced by the electrostatic field will induce shearing stresses, since the viscous forces within the gas will prevent the rotation at the wall and transmit a shearing stress throughout the gas. The removal of the gas of neutral and reacted atoms is through orifices in the walls, such as 24, and through tubes 22. Compressing the removed gas and injecting fresh or enriched reactant material is required in any case and the movement of the jets will reduce the electrostatic fields.

*Transistory electrical fields.*—Since an electrical field does not produce a current directly, but only indirectly through dynamical effects, a field due to a local charge distribution will not rapidly disappear. The high conductivity along the lines of force will maintain a constant potential all along any one line of force. On adjacent lines of force, however, a different potential may be found. Consider a length $q$ of the tube, and consider a small increment cylinder within and lengthwise the tube, with a radius of 2 centimeters and a cross section of approximately 12 square centimeters. Since the radius of gyration of a positive ion is about one centimeter under the defined standard conditions, a great proportion of the ions inside this increment considered cylinder will remain inside the cylinder during the effective time $\tau$ between collisions. If the density of ions is $3 \times 10^{14}$/cubic cm., the total number of ions in this increment cylinder will be $4 \times 10^{15} \cdot q$. Statistical fluctuations will produce deviations of approximately the square root of this quantity, or $6 \times 10^7/q^{1/2}$, yielding a charge fluctuation of about $3 \times 10^{-2}/q^{1/2}$ E.S.U. The field E resulting from this charge fluctuation will be $1.5 \times 10^{-2}/q^{1/2}$ E.S.U. at the boundary of the cylinder and the resulting velocity of the ions will be $cE/H$, or $2 \times 10^4/q^{1/2}$ cm./sec. For an infinite cylinder the velocity of the ions is negligible, and even if $q$ is only 100 cm., the velocity of the ions is not serious. The jets, however, provide conducting paths which would tend to neutralize any potential differences that may exist between different lines of force.

*Performance of a finite, curved reactor.*—To operate a finite reactor, the two ends of a cylindrical reactor must be terminated without loss of the energized particles. The simplest means to effect this is to bend a tube into a circle and join the ends together, forming a torus, or doughnut-shaped reactor. Most of the characteristics of the cylindrical reactor are also shared by such a toroidal reactor. However, the curvature of the magnetic field must be considered.

When a magnetic field is not completely uniform, charged particles will not simply spiral about the lines of force but will also have a drift velocity across the lines of force. For example, if the magnetic field H in the $z$ direction increases in the $x$ direction, an ion of charge $e$ and mass $m$ will show a drift velocity $v_y$ along the $y$ axis numerically equal to $$v_y = \frac{mu^2 c}{2eH} \frac{dH}{dx} \qquad (12)$$

where $u$ is the velocity perpendicular to H. See Figure 9 in which line 36 is the projected path of a charged particle spiraling in a magnetic field, increasing in intensity in the $+x$ direction, the lines of force 38 of which field are in a direction down through the plane of the paper of the Figure 9. The positive ions will drift in the opposite direction from the electrons. Similarly, if a particle is moving along the lines of force (in the $z$ direction) with a velocity of $w$, and these lines bend in the $z$-$x$ plane with a radius $r_a$, electrons will again drift in the $y$ direction with the velocity $$v_y = \frac{mw^2c}{eHr_a} \quad (13)$$

In a torus, H varies as $1/R$, where R is the distance from the central axis of the torus. Adding these two drifts, $$v_y = \frac{mc}{eH}(w^2 + \tfrac{1}{2}u^2)\frac{1}{r_a} \quad (14)$$

or for a Maxwellian distribution of velocities $$v_y = 2kTc/eHr_a \quad (15)$$

It will be noted that $v_y$ is independent of particle mass. The quantity $eH/mc$ is simply the angular frequency of gyration in the magnetic field and equals about $10^8$ for deuterons and $4 \times 10^{11}$ for electrons, if H is $2 \times 10^4$ gauss. If $r_a$ is 350 cm., $v_y$ is about $3.10^5$ cm./sec. In one tour around the torus the average particle would experience a total lateral drift of about $2\pi\rho$, or some 6 centimeters for deuterons.

Actually these drifts would not normally materialize, since they would produce a large separation of the charged particles. The resultant electrostatic field would then produce a drift of both electrons and positive ions to the outer sides of the torus, and all the material in the reactor would strike the outer wall before one circuit of the torus had been completed. To prevent this result, it would be necessary to feed continuously into the reactor tube positive ions and electrons at the top and bottom of the tube, thus allowing the vertical drifts to develop without producing an electrostatic charge. If the tube radius were 50 centimeters, the particles would drift across the tube in $10^{-3}$ seconds, which is somewhat less than the time between collisions. The loss of kinetic energy at the top and bottom of the tube would exceed $P_W$ found in Equation 10 by the factor of $10^4$. The energetic recoil nuclei from the nuclear reactions would drift out of the tube 10 even more rapidly than would the reacting ions.

To provide for a continuous reaction, the reactor tube 10 is bent into the shape of a "figure 8" or pretzel, as shown in Figures 1 and 2. The reactor tube 10 thus consists of end loops 12 and central sections 11, the central sections 11 passing one above the other. The two end loops 12 need not be in the same plane but their planes should be parallel. This form of reactor tube consists essentially of two tori, with magnetic fields in opposite directions, linked together in the form of a pretzel. It is apparent that the direction of the drift of an ion passing through one end loop of the pretzel will be in the opposite direction from the drift of the same ion passing through the other end loop. Thus a positive ion will go up, for example see arrow 40 in Figure 2, about 3 cm. passing through one end loop and down 3 cm. (arrow 42) passing through the other end loop. Thus, for particles that have an appreciable velocity along the lines of force, the drifts will cancel out in one circuit of the tube. For the electrons, the drifts are less by a factor of 60.

Those ions whose velocity component along the lines of force is small will pass slowly around one end loop of the tube, and for these the drift velocity may be critical. In particular, any ion that takes longer than $3 \times 10^{-4}$ seconds to pass around one end loop will be driven against the top or bottom of the tube 10. If the tube is bent in a circle of radius 350 centimeters, all particles whose velocities along the lines of force are less than $3 \times 10^6$ cm./sec. will drift out. Only approximately three percent of the ions will have such a low velocity in one direction and, on the average, a particular ion will possess such a low velocity for only a small fraction of the relaxation time or time between collisions $\tau$, which, under the defined standard conditions, is $3 \times 10^{-3}$ sec. Moreover, the presence of a radial electrical field will tend to destroy the systematic drift, producing instead a spiraling motion of each ion about the tube axis. Some additional electrostatic fields will tend to develop, but along each line of force these additional fields will have opposite signs in the opposite end loops of the pretzel, and will therefore be readily neutralized.

*Starting, stopping, and operating a Stellarator.*—Inject into tube 10 (Species A) through passage 22 a quantity of reactants in the form of a gas and to a density of $10^{14}$; start circulation of the neutron slowing and energy absorbing medium 16 and water-cooling systems for tube 14 and coil 18, also coil 21 if it is to be used. Apply currents in coil 18 to produce a magnetic field within tube 10 of 20,000 gauss to initiate reactions and to confine the ions to spiral paths about the lines of force and prevent them from striking the tube walls; apply currents in coils 30 to bend the magnetic field H at gap 25 into hollow cones 28, which magnetic field may be detected at the end plates 32 of tubes 28; apply currents to coil 21 (if desirable) to excite by induction a glow discharge in the tube 10, ionize the reactants and bring the kinetic temperature T to $10^8$ degrees, or more, whereupon reactions take place and continue; withdraw neutralized reactant ions and reacted particles from the tube 10 through pipes 35 and replenish, as neded, the tube 10 with fresh or enriched reactants through tube 22 and orifice 24 in the form of a high velocity jet. The reactor may be more easily started by charging the tube 10 with reactants to a density of only $10^{10}$ and, after the temperature has risen, the density may be raised to $10^{14}$. The operation of the reactor is stopped by cutting off the supply of reactants. In a deuterium-tritium reactor, half of the positive ions in the defined standard conditions combine to form $He^4$ in approximately 100 seconds.

The starting, stopping, and operating of a reactor of Species B are the same, except that the current in coil 18 would be controlled in accordance with the phases of the cycle disclosed in connection with Figure 6 and there are no electromagnetic coils 30 included in Species B to which electric currents need be supplied. Ions and reacted particles are withdrawn and fresh or enriched reaction materials are injected into tube 10 through a plurality of separate tubes 22 and orifices 24.

There have thus been disclosed two embodiments of the invention, the methods, physical dimensions and forms and the operation ranges of the various variables being set forth herein only as a basis for the analysis of and a demonstration of the relations between the mutually involved and selective and adjustable variables. It will, therefore, be understood that the invention as disclosed herein is not limited to the said standard conditions, but that changes and variations in dimensions, form and operating conditions, as may be apparent to those skilled in the art, may be made within the scope of the appended claims.

What is claimed is:

1. Apparatus for raising a gas to high temperature and producing neutrons therein comprising an endless magnetically permeable tube having circular end loops and intercrossing sections connecting said end loops, means for introducing a gas into said tube, magnetic coil means disposed helically about said tube for establishing within said tube a unidirectional magnetic field parallel to the axis of said tube substantially throughout the length thereof, means for energizing said coil means with electrical current of such value that said magnetic field is effective to ionize the gas within said tube, to prevent the ionized particles from colliding with the walls of said tube, and to produce neutrons by nuclear reactions, and means for withdrawing particles from said tube.

2. Apparatus as defined in claim 1 wherein the magnetic coil means includes coil means for producing within said tube an alternating magnetic field parallel to the axis of said tube along at least a portion of the length thereof.

3. Apparatus as defined in claim 1 wherein said circular end loops lie in parallel planes.

4. Apparatus as defined in claim 1 wherein said tube is discontinuous at at least one point in the length thereof to provide a gap therein and means are provided for applying a plurality of magnetic fields radially of said tube at said gap whereby the lines of force in the peripheral zone of said tube at said gap are caused to pass through said gap.

5. Apparatus as defined in claim 1 wherein said means for introducing a gas includes means for injecting high velocity jets of gas into said tube radially of the axis thereof.

6. A method of raising a gas to high temperature and producing neutrons therein which comprises supplying atoms selected from isotopes of hydrogen to an endless reaction zone having circular end loops and intercrossing sections connecting said end loops, and applying a unidirectional magnetic field parallel to the axis of said zone to ionize said atoms, to accelerate the ionized particles therein to high velocities about the axis of said reaction zone, to prevent the ionized particles from colliding with the boundaries of said reaction zone, and to induce neutron producing nuclear reactions.

7. A method as defined in claim 6 wherein an alternating magnetic field is superimposed on said undirectional magnetic field to further ionize and accelerate the ionized particles.

8. A method as defined in claim 6 wherein the unidirectional field is intermittent.

References Cited in the file of this patent

UNITED STATES PATENTS

| | | |
|---|---|---|
| 2,297,305 | Kerst | Sept. 29, 1942 |
| 2,394,073 | Westendorp | Feb. 5, 1946 |

FOREIGN PATENTS

| | | |
|---|---|---|
| 299,735 | Great Britain | Oct. 30, 1928 |
| 637,866 | Great Britain | May 31, 1950 |

OTHER REFERENCES

Encyclopedia of Atomic Energy, Frank Gaynor, Philosophical Library, Inc., N.Y.C., page 129.

Physical Review 59 (1941), pp. 997–1004 (an article by Smith).

Physical Society of London, Proceedings, vol. 64–B (1951), February 1, 1951, S. W. Cousins and A. A. Ware, pp. 159–166.

Proceedings of the Physical Society, vol. 64-B (1951), pp. 345, 350–354, Thonemann and Cawhig.

Chemical and Engineering News, October 10, 1955, pp. 4290, 4292.

Nucleonics, February 1956, pp. 42, 43, 44.

Nuclear Science and Engineering, The Journal of the American Nuclear Society, vol. 1, No. 4, August 1956, Edward Teller, pp. 313, 320, 321, 322, 323.

R. F. Post, "Reviews of Modern Physics," vol. 28. No. 3, July 1956, pp. 338, 339, 344, 345, 346, 347, 349, 359–362.

The Washington Post and Times Herald, December 12, 1957, p. C22.

Atomics and Nuclear Energy, February 1958, pp. 58, 59, "Thermonuclear Fusion," British and American Progress Report.